United States Patent [19]

Clark

[11] 4,455,319

[45] Jun. 19, 1984

[54] METHOD OF EFFECTING LONG WAVELENGTH RADIATION COOKING

[75] Inventor: Robert H. Clark, Columbia, Mo.

[73] Assignee: Toastmaster, Inc., Columbia, Mo.

[21] Appl. No.: 395,808

[22] Filed: Jul. 6, 1982

[51] Int. Cl.³ ........................ A47J 27/62; A21B 2/00; A23L 1/00

[52] U.S. Cl. ........................ 426/233; 99/447; 99/451; 126/19 R; 219/345; 426/523

[58] Field of Search ............... 219/345, 405, 406, 407, 219/408, 411, 413, 395, 397, 398; 99/447, 451; 426/243, 233, 523; 126/19 R; 427/126.2

[56] References Cited

U.S. PATENT DOCUMENTS

| | | | |
|---|---|---|---|
| 1,392,802 | 10/1921 | Serrell | 219/395 |
| 1,630,237 | 5/1927 | Smith | 219/417 |
| 2,708,708 | 5/1955 | Ronsch | 219/392 |
| 2,824,943 | 2/1958 | Laughlin . | |
| 2,833,906 | 5/1958 | Wingo | 219/405 |
| 2,860,225 | 11/1958 | Steen . | |
| 2,864,932 | 12/1958 | Forrer | 219/405 |
| 2,980,544 | 4/1961 | Mills | 99/239 |
| 3,003,409 | 10/1961 | Mills | 99/331 |
| 3,145,289 | 8/1964 | Swetlitz | 219/395 |
| 3,155,814 | 11/1964 | Appleman et al. | 219/407 |
| 3,249,741 | 5/1966 | Mills | 219/388 |
| 3,265,861 | 8/1966 | Perlman | 219/399 |
| 3,313,917 | 4/1967 | Ditzler et al. | 219/400 |
| 3,414,709 | 12/1968 | Tricault | 219/411 |
| 3,585,360 | 6/1971 | Young et al. | 219/405 |
| 3,590,801 | 7/1971 | Long | 126/19 R |
| 3,626,155 | 12/1971 | Joeckel | 219/411 |
| 3,682,643 | 8/1972 | Foster | 426/233 |
| 3,699,295 | 9/1971 | Bielefeldt | 219/388 |
| 3,820,525 | 6/1974 | Pond | 126/21 A |
| 3,974,360 | 8/1976 | Panzarino | 219/543 |
| 4,031,353 | 6/1977 | Rueda Sequra | 219/345 |
| 4,103,277 | 7/1978 | Griffin et al. | 338/237 |
| 4,164,643 | 8/1979 | Peart et al. | 219/411 |
| 4,207,456 | 6/1980 | Best | 219/345 |
| 4,208,573 | 6/1980 | Risse | 219/405 |
| 4,215,266 | 7/1980 | Smith et al. | 219/413 |
| 4,238,669 | 12/1980 | Huntley | 219/405 |
| 4,243,874 | 1/1981 | Fisher | 219/467 |

OTHER PUBLICATIONS

Technical Information—Vyloc II Continuous Cleaning Finish—Du Pont.

*Primary Examiner*—Raymond N. Jones
*Assistant Examiner*—George C. Yeung
*Attorney, Agent, or Firm*—Kokjer, Kircher, Bradley, Wharton, Bowman & Johnson

[57] ABSTRACT

A long wavelength counter top radiation oven in which the top and bottom surfaces of the oven cavity are formed by metal radiator panels each heated by an electric resistance heating element. A low temperature cured ceramic surface coating applied to each panel gives it a surface emissivity near unity to enhance the thermal efficiency of the oven. Separate high temperature thermostats control the upper and lower heating elements independently.

2 Claims, 6 Drawing Figures

*Fig. 5.*
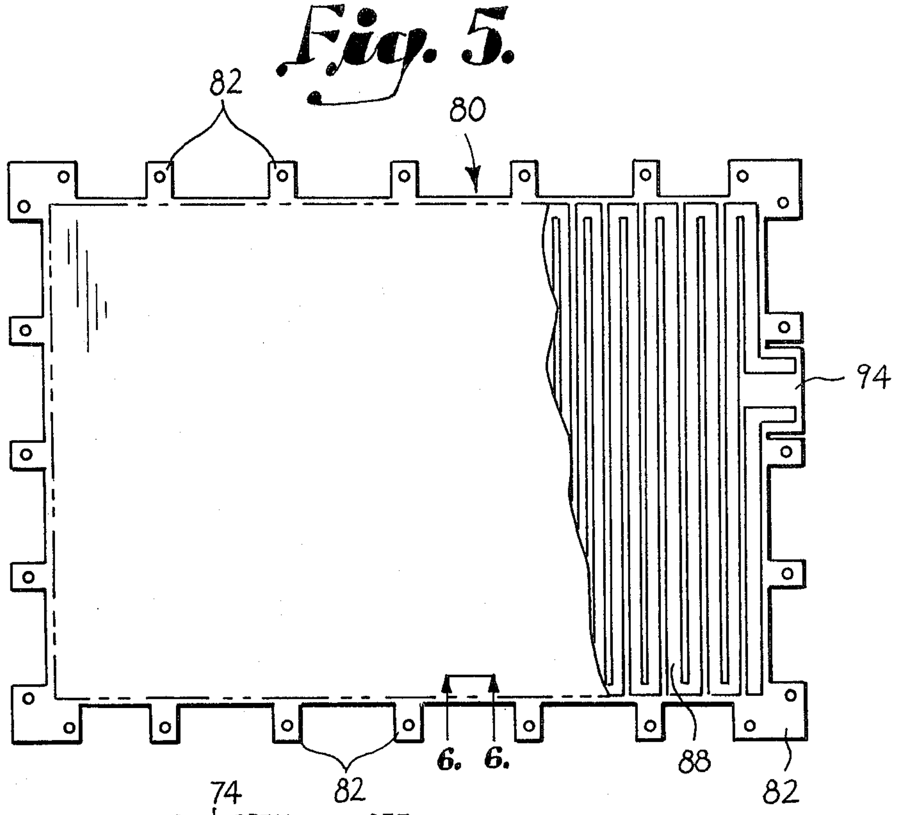
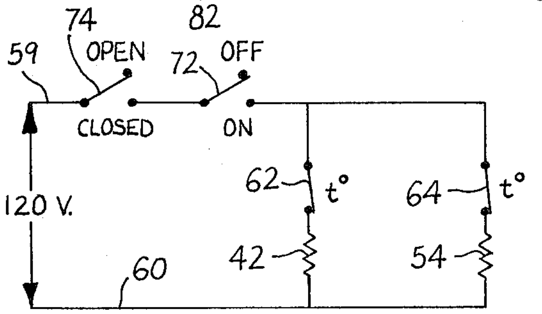
*Fig. 4.*
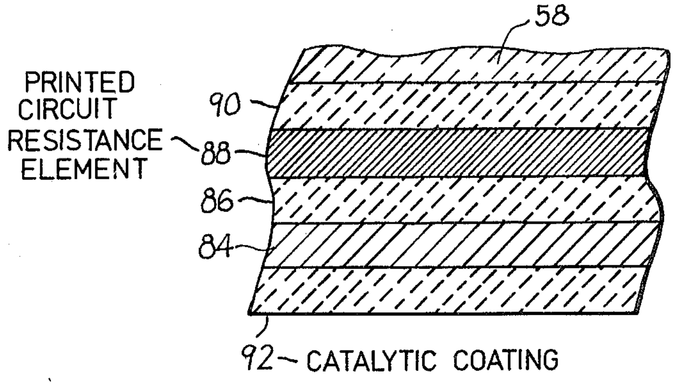
*Fig. 6.*

METHOD OF EFFECTING LONG WAVELENGTH RADIATION COOKING

BACKGROUND AND SUMMARY OF THE INVENTION

This invention relates in general to domestic cooking devices and deals more particularly with a counter top oven that cooks foods by radiating thermal energy from heated radiator panels.

Long wavelength radiation cooking involves the heating of radiator panels to relatively high temperatures in the range of about 400° F. to 850° F. The radiator panels have high emissivity, and the thermal energy radiates from them into the oven where it is used to cook food. Baking, broiling, roasting and other cooking operations can be carried out more quickly and efficiently by this method than they can in conventional ovens. Long wavelength radiation cooking also has the advantage of cooking foods more evenly with greater retention of moisture and nutrients.

Even though these advantages are recognized, long wavelength ovens suitable for domestic use have not been available in the past. Ceramic plates and glass panels have been proposed for use as radiator panels, but the high cost of these materials results in unduly high manufacturing costs. The material selected for the radiator panels must be physically durable and capable of withstanding operating temperatures of 850° F. Also, the emissive power of the material must be as high as possible at wavelengths associated with emperatures between 400° and 800° F. to maximize the thermal efficiency of the oven.

The present invention provides an improved long wavelength radiation oven having a relatively low manufacturing cost and a high operating efficiency. In accordance with the invention, a counter top oven has an oven cavity that is well insulated from the outer housing or shell of the oven. The top and bottom surfaces of the oven cavity are formed by metal radiator panels which are coated with a special catalytic coating having an emissivity near unity. Electric heating elements are attached to the top surface of the top radiator panel and to the bottom surface of the bottom radiator panel in order to evenly heat the radiator panels when energized. Each heating element is independently controlled by a high temperature thermostat so that the two panels can be heated to different temperatures.

The catalytic coating is preferably a commerically available ceramic continuous clean coating for ovens which enhances the emissivity of the radiator panels to improve their ability to radiate thermal energy into the oven cavity. The coating provides both panels with a surface emissivity that approaches unity. The coating material also meets the requirements of physical durability and high temperature operating capability, and it can be applied and cured at temperatures below the melting temperature of the metal panels, which are aluminum in one form of the invention and steel in another form of the invention.

The radiator panels located above and below the oven cavity provide large surface areas which are heated evenly by the heating elements and which have a surface emissivity near one. Consequently, a high thermal efficiency is achieved, and the oven operates in a reliable manner to cook foods more quickly and evenly than occurs in conventional ovens. At the same time, the manufacturing cost of the oven is low in comparison to ovens using relatively expensive ceramic or glass radiator panels.

DETAILED DESCRIPTION OF THE INVENTION

In the accompanying drawings which form a part of the specification and are to be read in conjunction therewith and in which like reference numerals are used to indicate like parts in the various views:

FIG. 4 is a schematic diagram of the electric control circuit for the oven.

FIG. 5 is a top plan view of an alternative radiator panel, with a portion broken away for illustrative purposes; and FIG. 6 is a fragmentary sectional view on an enlarged scale taken generally along line 6—6 of FIG. 5 in the direction of the arrows.

Figure 1:
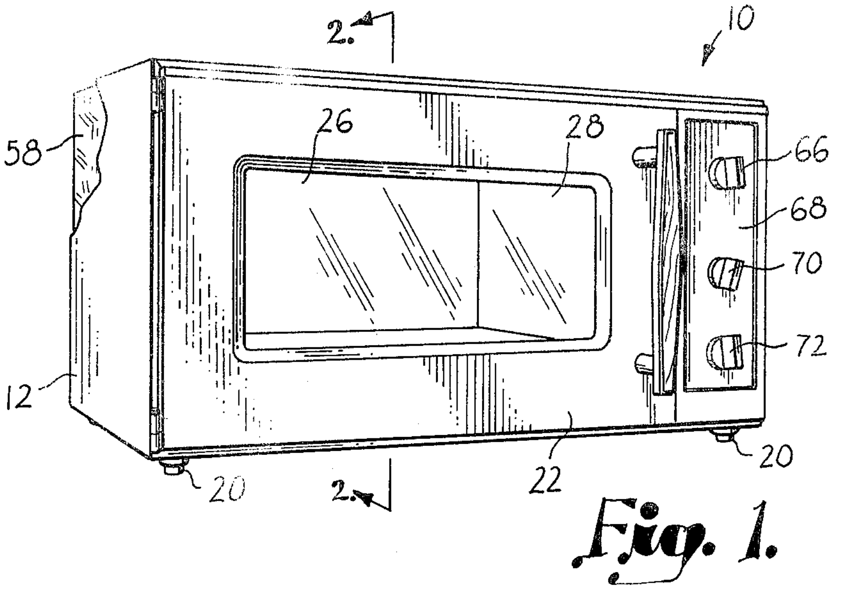
FIG. 1 is a perspective view of a long wavelength radiation oven constructed according to a preferred embodiment of the present invention, with a portion of the housing broken away for illustrative purposes.
Figure 2:
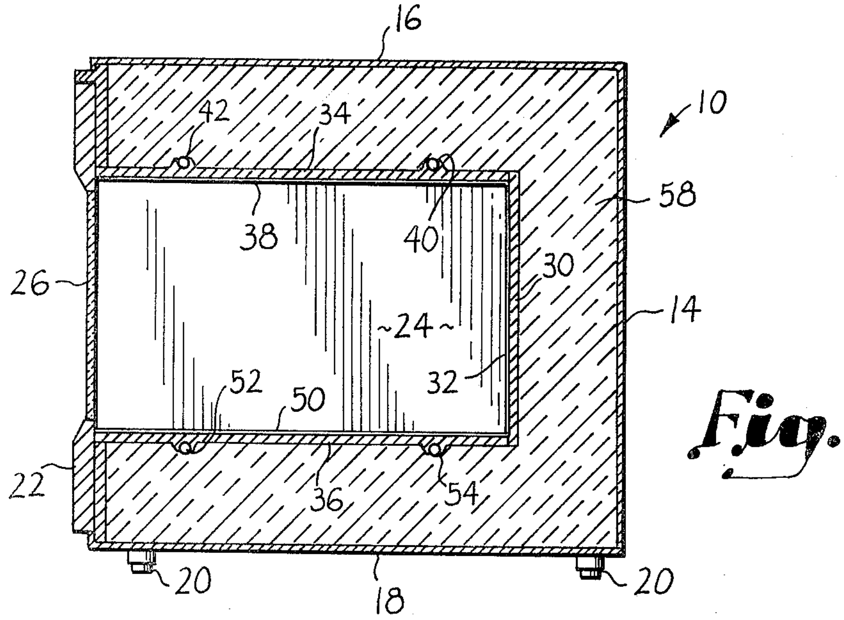
FIG. 2 is a sectional view on an enlarged scale taken generally along line 2—2 of FIG. 1 in the direction of the arrows.

Referring initially to FIGS. 1 and 2, numeral 10 generally designates a long wavelength radiation oven constructed in accordance with the present invention. The oven 10 is a counter top unit intended for domestic use, and its general construction is conventional for the most part. The outer housing of the oven 10 is formed by a rectangular shell having a pair of opposite side panels 12, a back panel 14, and top and bottom panels 16 and 18, respectively. The housing panels are suitably connected with one another, and the bottom panel 18 is provided with feet 20 which permit the unit to be placed on a counter top or table top. The front of the housing is provided with a hinged door 22 which may be opened and closed to provide access to the oven cavity or compartment 24 formed within the oven. The door 22 has a transparent window 26 which permits viewing of the oven cavity and its contents.

The opposite sides of the oven cavity 24 are formed by a pair of side walls 28, and the back of the oven cavity is formed by a back wall 30 extending between the side walls. The walls 28 and 30 are metal panels and are preferably constructed of steel. The inside surface of each of the walls 28 and 30 is coated with a conventional porcelain enamel coating 32, preferably a catalytic ceramic material of the type commonly used as a surface coating in continuous clean ovens. The catalytic coating 32 provides the side and back walls 28 and 30 with the desired thermal characteristics and facilitates reradiation of heat from the side and back walls back into the oven cavity 24.

In accordance with the present invention, the ceiling and floor surfaces of the oven cavity 24 are formed by special radiator panels 34 and 36. Both radiator panels 34 and 36 are cast aluminum plates having a rectangular shape. The flat lower surface of the top radiator panel 34 is provided with a catalytic coating 38 which enhances the surface emissivity of the radiator panel. The coating 38 will be described in more detail hereinafter.

Figure 3:
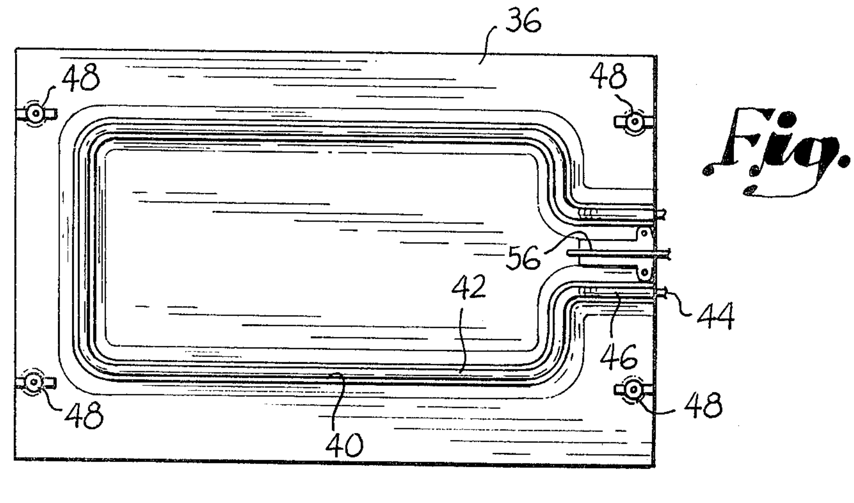
FIG. 3 is a top plan view of the top radiator panel of the oven.

As best shown in FIG. 3, the upper surface of the top radiator panel 34 has an elongated groove 40. The groove 40 may be cast into the surface of the radiator panel, and it has the general shape of a loop extending generally around the entirety of the surface of the panel. Staked in the groove 40 is a tubular sheathed electric heating element 42 having an electrically resistive heater wire 44 (insulated by magnesium or aluminum dioxide) extending within a tubular aluminum sheath 46. The heating element 42 is staked in the groove 40 in intimate thermal contact with the upper surface of panel 34 in order to evenly heat the panel upon energization of the heater wire. Bosses 48 are cast on the upper surface of panel 34 to facilitate mounting and connection of the panel at the appropriate location within the housing of the unit.

The bottom radiator panel 36 is constructed in the same manner as the top panel 34, except that the bottom panel has a catalytic coating 50 on its upper surface and carries an electric heating element 52 in a groove 54 formed on its lower surface. A temperature sensor is attached in intimate thermal contact to each panel 34 and 36 and is suitably connected with a thermostat, as by means of a cpaillary tube 56 (see FIG. 3). Rather than staking the heating elements into cast grooves in the radiator panels, the heating elements can be cast directly into the panels or can be attached to the panels by other means such as by brazing.

The top and bottom panels 34 and 36 are suitably secured in place above and below the oven cavity 24 to cooperate with the side walls 28 and back wall 30 in forming the encolsed oven compartment. The panels forming the oven compartment are spaced well inwardly from the corresponding panels of the outer housing, and relatively thick thermal insulation 58 is interposed between the oven cavity and the housing. The insulation 58 may be fiberglass or mineral wool type insulation, and it is applied between panels 16 and 34, between panels 18 and 36, between the back panel 14 and the back wall 30 of the oven cavity, and between the side panels 12 and the side walls 28 of the oven cavity in order to completely insulate the housing from the oven cavity. Preferably, the insulation is approximately one inch thick, and a sheet of aluminum foil (not shown) acting as a thermal radiation shield may be provided in conjunction with the fibrous insulation.

The catalytic coating 38 and 50 which is applied to both radiator panels 34 and 36 is preferably a ceramic surface coating that is commercially available from the Dupont Company under the trade designation Vyloc-®II. This coating material provides a "continuous clean" surface coating having an emissivity near unity based on measurements that have been taken of cured samples at the temperatures associated with those long wave lengths found to be most effective in cooking. The physical properties of the coating are desirable in that it is physically durable and can withstand operating temperatures up to at least 850° F. It is also suitable for application to die cast aluminum panels and can be applied and cured at temperatures below the melting temperature of aluminum.

FIG. 4 illustrates a simple electric control circuit which controls the operation of the upper heating element 42 and the lower heating element 54. Standard 120 volt AC household power is applied to a pair of conductors 59 and 60 which lead to a plug (not shown) that may be inserted into a wall receptacle. The heating elements 42 and 54 are connected between lines 59 and 60 in parallel with one another. In series with the upper heating element 42 is a high temperature thermostat 62 which controls the temperature of the top panel 34. Another high temperature thermostat 64 is arranged in series with the lower heating element 54. The thermostats 62 and 64 sense the temperatures of the respective top and bottom radiator panels, and the thermostat contacts open to deactivate the associated heating element when the sensed temperature exceeds the temperature set on the thermostat. The thermostat contacts remain closed when the sensed temperature is below the thermostat setting. The setting of the thermostat 62 for the top radiator panel is controlled by a knob 66 (see FIG. 1) located on a control panel 68 on the front of the oven housing. The thermostat 64 for the lower radiator panel 36 is similarly controlled by a knob 70 on panel 68. The control panel also includes a third knob 72 which is an on/off switch located in conductor 59.

In operation of the long wavelength radiation oven 10, food that is to be cooked may be inserted into the oven cavity 24 by opening door 22. The door is then closed, and knobs 66 and 70 are adjusted to the desired temperatures for the top and bottom radiator panels 34 and 36. It is noted that since each radiator panel has its own thermostat, the two radiator panels are controlled independently and can be heated to different temperatures. Also, either of the panels can be made to remain inactive by turning the corresponding control knob to the off position.

Once the thermostat knobs 66 and 70 have been set as desired, the on/off knob 72 is turned to the on position in order to apply current to the heating elements 42 and 54 so long as the thermostats 62 and 64 remain unsatisfied. The top and bottom radiator panels 34 and 36 are evenly heatd by the heating elements, and the panels radiate thermal energy into the oven cavity 24 containing the food that is to be cooked. The catalytic coatings 38 and 50 provide the radiator panels with a surface emissivity near unity, and the heat that is applied to the panels is thus efficiently radiated into the oven cavity to provide the oven with high thermal efficiency. The coating 32 on the side walls 28 and back wall 30 causes the oven walls to reradiate the heat reaching them back into the oven cavity. The "continuous clean" coatings also maintain the oven surfaces in a clean condition.

When the temperature of the top radiator panel 34 reaches the temperature at which knob 66 is set, the top thermostat 62 is satisfied and opens its contacts to deenergize the upper heating element 42. Similarly, the lower heating element 54 is deenergized when the lower thermostat 64 is satisfied and its contacts open.

In normal operation of the oven, the radiator panels 34 and 36 are heated to temperatures of 400° F. to 850° F. (depending upon the cooking operation that is to be carried out and the type of food being cooked), and the materials must be capable of withstanding these high temperatures. The coated aluminum panels 34 and 36 are able to readily withstand the high temperatures to which they are heated, and the cast aluminum panels are more economical than glass or ceramic panels. Accordingly, the oven has a relatively low manufacturing cost. At the same time, the large surface areas presented by the radiator panels, the even manner in which heat is applied to them by the heating elements, and the high emissivity of the coatings 38 and 50 result in the oven having a high thermal efficiency. It has been found that the oven 10 bakes and broils foods faster than conventional ovens and cooks more evenly with greater moisture and nutrient retention than occurs in conventional ovens.

Referring now to FIGS. 5 and 6, numeral 80 generally designates an alternative radiator panel that may be employed in the oven 10 in place of the aluminum radiator panels 34 and 36. Panel 80 is generally rectangular and has the same size and shape as the radiator panels 34 and 36. Its periphery is provided with a series of tabs 82 which facilitate its mounting and connection with other components of the oven and which minimizes conductive heat transfer to the side walls. As shown in FIG. 6, the panel 80 includes a steel sheet 84 forming a substrate having a flat surface which is coated with a layer 86 of ceramic dielectric. A printed circuit resistive heating element 88 is screened on the dielectric layer 86, and another coat of ceramic dielectric 90 is applied to the printed circuit 88. In this manner, the printed circuit resistance element 88 is screened onto the steel substrate 84 and is sandwiched between the two layers 86 and 90 of the ceramic dielectric.

The printed circuit 88 is arranged in a serpentine configuration covering substantially the entire surface of the panel, as shown in FIG. 5. Catalytic coating 92 (FIG. 6) which may be the same material as the coatings 38 and 50 discussed previously, is applied to the surface of the steel sheet 84 opposite the surface carrying the printed circuit 88. If the radiator panel is the top radiator panel of the oven, the coating 92 is located on the lower surface of the panel, and if the panel is the lower radiator panel of the oven, the catalytic coating 92 is on the upper surface of the panel. Electrical connection between the printed circuit resistance element 88 and suitable wiring can be made at 94 (FIG. 5).

The oven operates in substantially the same manner indicated previously when two panels 80 are used as the top and bottom radiator panels of the oven. Again, the operating temperatures of the radiator panels are in the general range of 400° F. to 850° F., and the printed circuit heating element operates on 120 volt AC household power at 60 Hz. The electrical insulation provided by the dielectric coatings 86 and 90 completely encapsulates the printed circuit heating element 88. In order that the panel 80 exhibit low thermal inertia, it is desirable for the thickness of the steel substrate 84 to be minimized, consistent with structural stability and warpage control.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A method of effecting long wavelength radiation cooking, said method comprising the steps of:

providing an enclosed cooking space bounded at the top by a top radiator panel and at the bottom by a bottom radiator panel, each panel being aluminum and having upper and lower surfaces;

coating the lower surface of the top radiator panel and the upper surface of the bottom radiator panel with a cured ceramic coating material having an emissivity near unity and a curing temperature below the melting temperature of aluminum, said coated lower and upper surfaces respectively forming the top and bottom surfaces of said cooking space;

attaching electrically resistive heating elements to the upper surface of the top radiator panel and to the lower surface of the bottom radiator panel in intimate thermal contact with both panels;

inserting food into said cooking space; and applying electric current to said heating elements to heat said top and bottom panels to temperatures in the range of 400° F. to 850° F., whereby said coating material is heated to radiate heat at long wavelength into the cooking space for a period of time sufficient to cook said food.

2. A method as set forth in claim 1, including the step of independently controlling the temperature to which each panel is heated by said elements.

* * * * *